US011476481B2

(12) United States Patent
Yamamoto et al.

(10) Patent No.: US 11,476,481 B2
(45) Date of Patent: Oct. 18, 2022

(54) FUEL CELL SYSTEM AND CONTROL METHOD OF THE SAME

(71) Applicants: TOYOTA JIDOSHA KABUSHIKI KAISHA, Toyota (JP); AISAN KOGYO KABUSHIKI KAISHA, Obu (JP)

(72) Inventors: Kazuo Yamamoto, Toyota (JP); Jiro Oikawa, Tokai (JP)

(73) Assignees: Toyota Jidosha Kabushiki Kaisha, Toyota (JP); Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 17/336,487

(22) Filed: Jun. 2, 2021

(65) Prior Publication Data

US 2021/0391587 A1 Dec. 16, 2021

(30) Foreign Application Priority Data

Jun. 12, 2020 (JP) ............................. JP2020-102284

(51) Int. Cl.
*H01M 8/04* (2016.01)
*H01M 8/04746* (2016.01)
*H01M 8/04089* (2016.01)
*H01M 8/04992* (2016.01)

(52) U.S. Cl.
CPC ... *H01M 8/04753* (2013.01); *H01M 8/04089* (2013.01); *H01M 8/04992* (2013.01)

(58) Field of Classification Search
CPC ......... H01M 8/04753; H01M 8/04089; H01M 8/04992
See application file for complete search history.

(56) References Cited

U.S. PATENT DOCUMENTS

2008/0083394 A1 4/2008 Akita et al.
2017/0256805 A1* 9/2017 Sugiyama .......... H01M 8/04111

FOREIGN PATENT DOCUMENTS

JP 2005-310550 A 11/2005
JP 2008-088925 A 4/2008
JP 2010-146788 A 7/2010

* cited by examiner

*Primary Examiner* — Olatunji A Godo
(74) *Attorney, Agent, or Firm* — Finnegan, Henderson, Farabow, Garrett & Dunner, LLP

(57) ABSTRACT

A control device of a fuel cell system does not execute feedback control of an air valve in a case where a first condition in which a valve opening degree command value calculated by the control device is less than a command value threshold and a second condition in which a valve opening degree measurement value measured by an air valve opening degree sensor is less than a measurement value threshold are satisfied, and executes the feedback control of the air valve in a case where the first condition or the second condition is not satisfied.

3 Claims, 6 Drawing Sheets

<BEHAVIOR OF VALVE AT TIME OF ACTIVATION OF SYSTEM>

<BEHAVIOR OF VALVE AT TIME OF REACTIVATION OF SYSTEM>

FUEL CELL SYSTEM AND CONTROL METHOD OF THE SAME

CROSS-REFERENCE TO RELATED APPLICATION

This application claims priority to Japanese Patent Application No. 2020-102284 filed on Jun. 12, 2020, incorporated herein by reference in its entirety.

BACKGROUND

1. Technical Field

The present disclosure relates to a fuel cell system and a control method of the same.

2. Description of Related Art

Japanese Unexamined Patent Application Publication No. 2008-88925 (JP 2008-88925 A) discloses that a valve opening degree is controlled with high accuracy by executing fully closed learning of an electronic throttle such that an idle speed is stable at idle after an engine is started.

SUMMARY

By the way, in the fuel cell system, valves provided in an air supply system and a hydrogen gas supply system are needed to have a sealing property during driving stop, and thus a seal member, such as rubber, is generally provided between a valve disc and a body (bore). In this case, when the valve is fully closed, the valve disc is in close contact with the seal member and a flow path is sealed.

Here, a pressure (tension force) generated between the valve disc and the seal member may vary depending on the environment or the manufacturing variations. Therefore, in a case where a control method of a valve opening degree in the related art disclosed in JP 2008-88925 A is applied to the control of the valve of the fuel cell system, there is a possibility that, due to the variation of the tension force, feedback control of the valve opening degree at the time of activation of the system is unstable and overshoot that extremely exceeds a target value occurs.

The present disclosure provides a fuel cell system capable of stably executing control of a valve opening degree.

A first aspect of the present disclosure provides a fuel cell system. The fuel cell system includes a valve, a valve opening degree measuring unit, and a control device. The valve is disposed in a flow path through which reaction gas supplied to a fuel cell flows. The valve opening degree measuring unit is configured to measure a valve opening degree measurement value of the valve. The control device is configured to calculate a valve opening degree command value of the valve based on a flow rate of the reaction gas calculated from a target electric power generation amount of the fuel cell and execute feedback control of operation of the valve based on the valve opening degree command value and the valve opening degree measurement value. The control device is configured not to execute the feedback control of the valve in a case where a first condition in which the valve opening degree command value is less than a command value threshold and a second condition in which the valve opening degree measurement value is less than a measurement value threshold are satisfied, and to execute the feedback control of the valve in a case where the first condition or the second condition is not satisfied.

In the fuel cell system according to the first aspect, the flow path may be a release flow path connected to an outlet of a cathode of the fuel cell, and the valve may be a discharge flow rate adjusting valve disposed in the release flow path.

In the fuel cell system according to the first aspect, the valve may include a valve body, a valve disc configured to open and close an internal flow path of the valve body by rotating with a valve stem as an axis, and a seal member disposed between the valve disc and the internal flow path of the valve body.

A second aspect of the present disclosure provides a control method of a fuel cell system including a valve disposed in a flow path through which reaction gas supplied to a fuel cell flows. The control method includes measuring, by a valve opening degree measuring unit, a valve opening degree measurement value of the valve, calculating, by a control device, a valve opening degree command value of the valve based on a flow rate of the reaction gas calculated from a target electric power generation amount of the fuel cell, and executing, by the control device, feedback control of operation of the valve based on the valve opening degree command value and the valve opening degree measurement value. By the control device, the feedback control of the valve is not executed in a case where a first condition in which the valve opening degree command value is less than a command value threshold and a second condition in which the valve opening degree measurement value is less than a measurement value threshold are satisfied, and the feedback control of the valve is executed in a case where the first condition or the second condition is not satisfied.

According to the present disclosure, a fuel cell system and a control method of the same capable of stably executing control of a valve opening degree can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
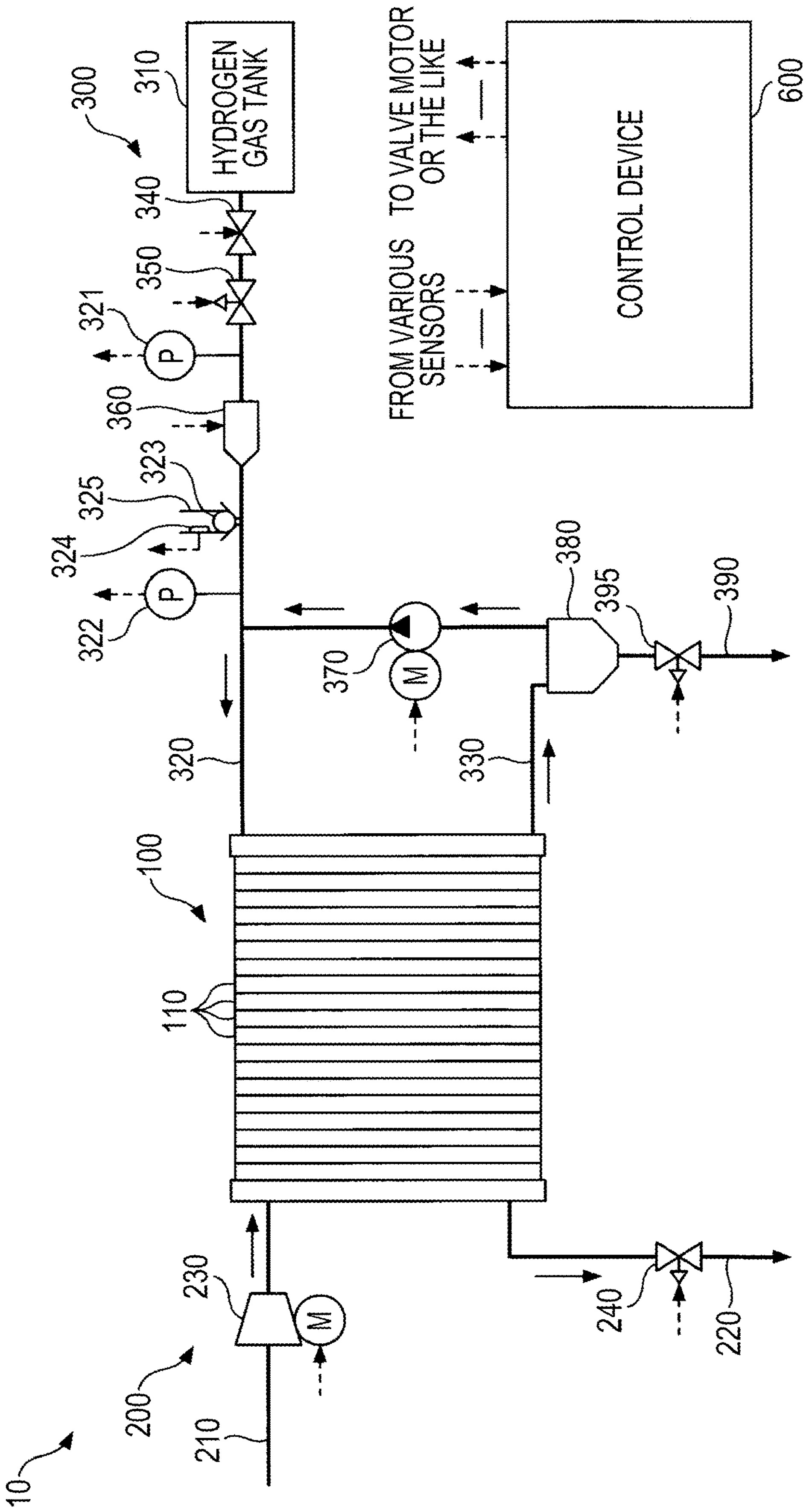
FIG. 1 is a diagram showing a schematic configuration of a fuel cell system according to an embodiment.

An embodiment will be described below with reference to the accompanying drawings. In order to facilitate understanding of the description, the same components are designated by the same reference numerals as much as possible in each drawing, and duplicate description will be omitted.

FIG. 1 is a diagram showing a schematic configuration of a fuel cell system 10 according to the embodiment. The fuel cell system 10 is mounted, for example, on a vehicle (fuel cell vehicle) and outputs electric power that is a power source of the vehicle in accordance with a need from a driver. The fuel cell system 10 includes a fuel cell (FC) 100, an air supply system 200, a hydrogen gas supply system 300, a cooling system (not shown), and a control device 600.

The fuel cell 100 has a stack structure in which cells of a plurality of single cells 110 as an electric power generating element are stacked. Each single cell 110 is configured by a membrane electrode assembly (MEA) in which both electrodes of an anode and a cathode are bonded to both sides of an electrolyte membrane, and two separators interposed between both sides of the anode and cathode of the membrane electrode assembly. The fuel cell 100 generates an electric power by an electrochemical reaction of hydrogen as fuel gas supplied to the anode from the hydrogen gas supply system 300 described below and oxygen as oxidation gas contained in air supplied to the cathode from the air supply system 200 and drives a load of a drive motor by the generated electric power.

The air supply system 200 supplies the air containing oxygen as oxidation gas to the cathode of the fuel cell 100. The air supply system 200 includes an oxygen supply flow path 210, a release flow path 220, a compressor 230, and a discharge flow rate adjusting valve 240. A first end of the oxygen supply flow path 210 is connected to an inlet of the cathode of the fuel cell 100, and a second end thereof is an opening end. The compressor 230 is provided in the oxygen supply flow path 210. A first end of the release flow path 220 is connected to an outlet of the cathode of the fuel cell. The discharge flow rate adjusting valve 240 is provided in the release flow path 220. The air supply system 200 adjusts a flow rate of the air taken in from the opening end of the oxygen supply flow path 210 with the compressor 230 and supplies the air to the cathode of the fuel cell 100. Further, the air supply system 200 releases the air (cathode off-gas) containing unconsumed oxygen discharged from the outlet of the cathode to the atmosphere at the flow rate adjusted by the discharge flow rate adjusting valve 240 of the release flow path 220. The operation of the air supply system 200 is executed by controlling the compressor 230 and the discharge flow rate adjusting valve 240 by the control device 600 described below. In the following description of the present embodiment, as an example of "valve disposed in the flow path through which the reaction gas supplied to the fuel cell flows" that is a control target of valve control described below in reference to FIG. 3 and the like, the discharge flow rate adjusting valve 240 is described. Further, the discharge flow rate adjusting valve 240 may be denoted as "FC outlet air valve". "air outlet valve", "air valve", or the like.

The hydrogen gas supply system 300 supplies hydrogen as fuel gas used for electric power generation of the fuel cell 100 to the anode of the fuel cell 100. The hydrogen gas supply system 300 includes a hydrogen gas tank 310 as a fuel tank, a hydrogen gas supply path 320 as a fuel gas supply flow path, a return path 330, an opening and closing valve 340, a pressure adjusting valve 350, an injector 360 as a fuel gas supply device, pressure sensors 321, 322, a relief valve 323, a hydrogen gas pump 370, a gas-liquid separator 380, a discharge valve 395, and a release flow path 390. The release flow path 390 is connected to the release flow path 220.

High-pressure hydrogen gas is stored in the hydrogen gas tank 310. The hydrogen gas tank 310 is connected to an inlet of the anode of the fuel cell 100 via the hydrogen gas supply path 320. In the hydrogen gas supply path 320, the opening and closing valve 340, the pressure adjusting valve 350, the pressure sensor 321, the injector 360, the relief valve 323, and the pressure sensor 322 are provided in this order from the hydrogen gas tank 310 side. The opening and closing valve 340 turns on and off the supply of the anode gas from the hydrogen gas tank 310. The pressure adjusting valve 350 adjusts a pressure of the hydrogen gas to be supplied to the injector 360. The injector 360 injects the hydrogen gas supplied from the pressure adjusting valve 350 toward the anode of the fuel cell 100 via the hydrogen gas supply path 320 at a cycle in accordance with the needed load, and adjusts a supply amount of the hydrogen gas to the fuel cell 100. A pressure on an upstream side of the injector 360 is detected by the pressure sensor 321 and a pressure on a downstream side of the injector 360 is detected by the pressure sensor 322. The relief valve 323 operates (is opened) when the pressure exceeds a preset pressure, and releases the hydrogen gas flowing through the hydrogen gas supply path 320 on the downstream side of the injector 360 from a release port of the relief valve 323. As a result, the relief valve 323 operates such that the pressure in the hydrogen gas supply path 320 on the downstream side of the injector 360 does not exceed the set pressure. A heat flow sensor 324 is provided at an end portion of a release pipe 325 connected to the release port of the relief valve 323, that is, immediately downstream of the relief valve 323. As described below, the heat flow sensor 324 detects a change in a heat flux that occurs due to the start of the release of the hydrogen gas from the release port in a case where the relief valve 323 is opened.

The hydrogen gas supplied to the fuel cell 100 via the hydrogen gas supply path 320 flows through a hydrogen gas flow path (not shown) on the supply side configured of a stack of the single cells 110, and is supplied to each single cell 110. Anode off-gas containing unused hydrogen gas that is not used in each single cell flows through the hydrogen gas flow path on the discharge side configured of a stack of the single cells 110, and is discharged to the return path 330. The anode off-gas contains liquid water generated by the electric power generation of each single cell 110 and impurity gas, such as nitrogen gas, that permeates from the cathode side to the anode side. That is, the anode off-gas is mixed gas containing the hydrogen gas and the impurity gas, such as the nitrogen gas.

The return path 330 is connected to an outlet of the anode of the fuel cell 100 and a portion of the hydrogen gas supply path 320 closer to the fuel cell 100 side than the pressure sensor 322, and returns the anode off-gas discharged from the fuel cell 100 to the hydrogen gas supply path 320. In the return path 330, the gas-liquid separator 380 and the hydrogen gas pump 370 are provided. The gas-liquid separator 380 separates the liquid water from the anode off-gas mixed with the liquid water discharged from the fuel cell 100. The anode off-gas obtained by separating the liquid water by the gas-liquid separator 380 is returned to the hydrogen gas supply path 320 via the return path 330 by the hydrogen gas pump 370, and the hydrogen gas contained in the anode off-gas circulates and is supplied to the fuel cell 100. Therefore, in actual, the anode gas (fuel gas) supplied to the fuel cell 100 is the mixed gas containing the hydrogen gas and the impurity gas.

In order to efficiently generate the electric power from the fuel cell 100, it is not preferable that the concentration of the impurity gas be high and the concentration of the hydrogen gas be low. Therefore, in a case where the concentration of the impurity gas contained in the anode off-gas is high and the concentration of the hydrogen gas is low, control of opening the discharge valve 395 and discharging the anode off-gas from the gas-liquid separator 380 to the release flow path 390 is executed. Further, in this case, by injecting the hydrogen gas from the injector 360, control of decreasing the concentration of the impurity gas and increasing the concentration of the hydrogen gas is executed.

Various operations of the hydrogen gas supply system 300 are executed by controlling the opening and closing valve 340, the pressure adjusting valve 350, the injector 360, the hydrogen gas pump 370, and the discharge valve 395 by the control device 600 described below.

The control device 600 is configured by a so-called microcomputer including a CPU, a ROM, a RAM, and the like that executes the logical operations. The control device 600 receives sensor inputs from the pressure sensors 321, 322, the heat flow sensor 324, the air valve opening degree sensor 63 (see FIG. 2) described below, or various sensors (not shown) to execute various controls of the components in the fuel cell 100, such as the compressor 230, the injector 360, the pressure adjusting valve 350, the opening and closing valve 340, the discharge valve 395, and the discharge flow rate adjusting valve 240.

Further, the control device 600 controls the operation of the fuel cell 100 by controlling the air supply system 200 or the hydrogen gas supply system 300. Further, based on an amount of change in the detection results of the pressure sensors 321, 322, a gas leak, a failure including the operation (opening) of the relief valve 323, a failure of various valves, and the like are detected.

Further, the control device 600 can control the valve opening degrees of various valves, such as the discharge flow rate adjusting valve 240, by using a feedback control method, such as proportional integral derivative (PID) control. The control parameters of the PID control can be acquired in advance by, for example, a preliminary simulation or an experiment. In particular, in the present embodiment, in the control of the discharge flow rate adjusting valve 240, execution and non-execution of the PID control can be decided depending on a predetermined condition described below and can be switched.

Figure 2:
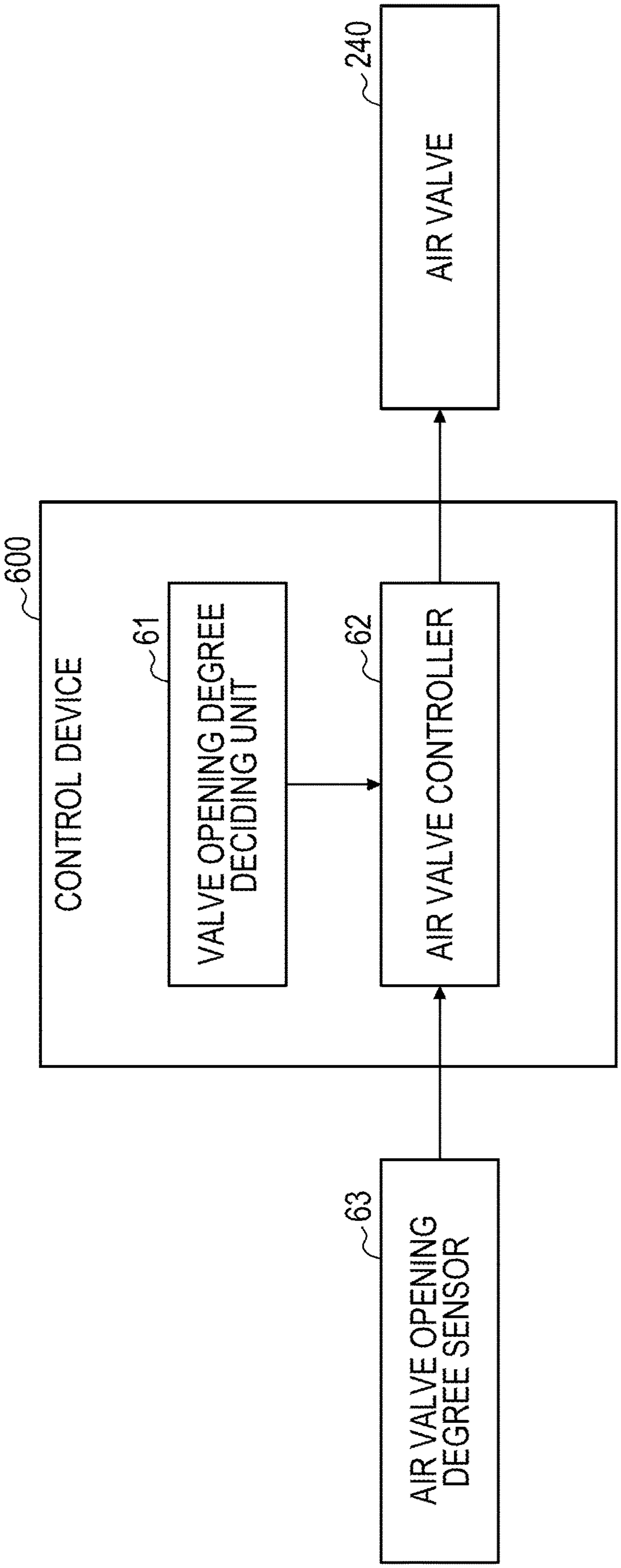
FIG. 2 is a functional block diagram of a control device in FIG. 1.

FIG. 2 is a functional block diagram of the control device 600 in FIG. 1. The air valve opening degree sensor 63 (valve opening degree measuring unit) and the discharge flow rate adjusting valve 240 are connected to the control device 600. The air valve opening degree sensor 63 measures an opening degree (valve opening degree measurement value) θm of the discharge flow rate adjusting valve 240 provided in the air supply system 200.

The control device 600 controls the operation of each element of a system, such as the discharge flow rate adjusting valve 240, based on various information of the system input from the air valve opening degree sensor 63 and the like.

With regard to the above functions, the control device 600 includes a valve opening degree deciding unit 61 and an air valve controller 62 as shown in FIG. 2, for example.

The valve opening degree deciding unit 61 calculates a command value θd of the opening degree of the discharge flow rate adjusting valve 240. For example, the valve opening degree command value θd is calculated based on the flow rate of the reaction gas calculated from the target electric power generation amount of the fuel cell 100.

The air valve controller 62 controls the operation of the discharge flow rate adjusting valve 240 based on the valve opening degree command value θd calculated by the valve opening degree deciding unit 61. The air valve controller 62 executes the feedback control, such as the PID control, such that the valve opening degree of the discharge flow rate adjusting valve 240 (valve opening degree measurement value θm measured by air valve opening degree sensor 63) follows the valve opening degree command value θd.

Further, the air valve controller 62 decides execution and non-execution of the PID control based on the valve opening degree measurement value ↓m measured by the air valve opening degree sensor 63 and the valve opening degree command value θd calculated by the valve opening degree deciding unit 61.

Figure 3:
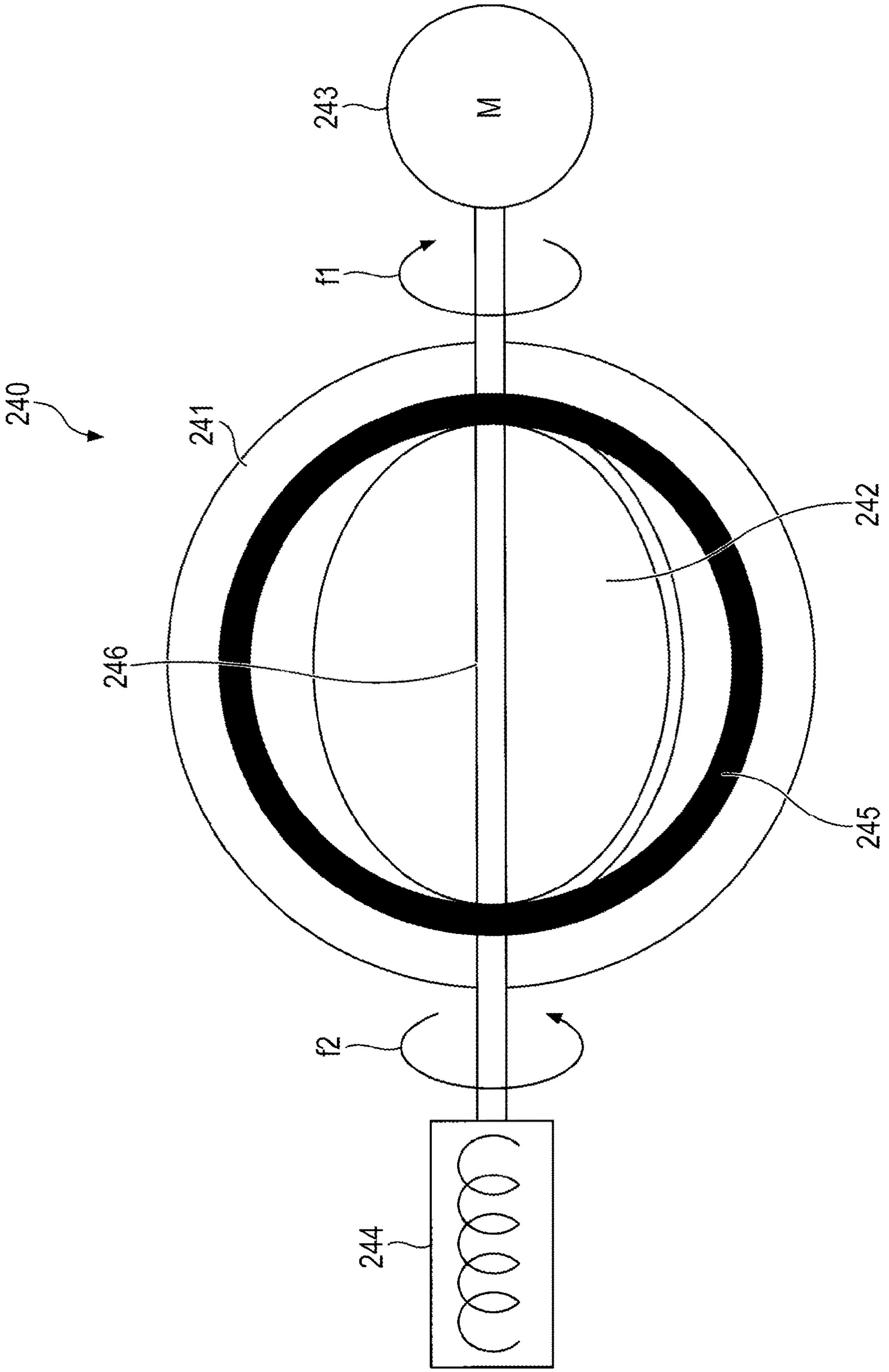
FIG. 3 is a schematic view showing a schematic configuration of a discharge flow rate adjusting valve.

Here, with reference to FIG. 3, a schematic configuration of the valve provided in the fuel cell system 10 and the problems in the related art will be described. FIG. 3 is a schematic view showing a schematic configuration of the discharge flow rate adjusting valve 240 as an example of the valve provided in the fuel cell system 10.

As shown in FIG. 3, the discharge flow rate adjusting valve 240 is, for example, a valve that is opened and closed by a discoid disc (valve disc) 242 rotating about 90 degrees with a stem (valve stem) 246 as an axis in the internal flow path (bore) of the valve body 241, that is, a so-called a butterfly valve. The discharge flow rate adjusting valve 240 moves rotationally around the valve stem 246 by a driving force f1 output from a motor 243. Further, biasing means, such as a spring 244, is connected to the valve stem 246, and a biasing force f2 is applied in a direction in which the valve disc 242 is fully closed. That is, the discharge flow rate adjusting valve 240 is a valve in which the energization to the valve is cut off and the fully closed state is maintained by the biasing force f2 of the spring 244 in a case where the driving force f1 by the motor 243 is not applied, that is, a so-called normally closed valve. When the valve is opened, the motor 243 outputs a torque opposite to the biasing force f2 in a closing direction to realize the valve opening operation.

Further, in the FC outlet air valve (discharge flow rate adjusting valve 240) provided in the release flow path 220 of the air supply system 200 of the fuel cell system 10, the hydrogen concentration contained in the exhaust gas has an upper limit, and thus the sealing property while the valve operation is being stopped (fully closed state) during non-energization is needed. Therefore, as shown in FIG. 3, the valve is configured in which a rubber lip 245 (seal member) is provided at a seal unit between the valve disc 242 and the bore of the valve body 241, the valve disc 242 is in close contact with the rubber lip 245 when the valve is fully closed, and the sealing property can be improved.

Here, as described above, in a case where the valve opening degree of the discharge flow rate adjusting valve 240 is controlled by executing the feedback control, such as the PID control, the control parameters used for the PID control are acquired in advance by, for example, a preliminary simulation or an experiment in many cases. However, the pressure (tension force) generated between the valve disc 242 and the rubber lip 245 may vary due to the difference in the usage environment or the manufacturing variations of each valve. Therefore, in a case where the pressure between the valve disc 242 and the rubber lip 245 is different from that at the time of parameter acquisition due to the variation in the tension force, there is a case where the feedback control of the valve opening degree is unstable, the opening degree cannot be maintained, the overshoot in which the valve opening degree increases extremely exceeding a target value occurs in a case of a low opening degree state close to the fully closed state, such as an idling state at the time of activation of the system.

Therefore, in the present embodiment, the air valve controller 62 of the control device 600 is configured not to execute the PID control (energization is cut off) in a case where a condition (first condition) in which the valve opening degree command value θd is less than a command value threshold θt1 and a state immediately after activation of the system is included is satisfied, and suppress the occurrence of the overshoot of the valve opening degree at the time of activation of the system.

However, in a case where the condition for stopping execution of the PID control is solely the first condition, there is a possibility that a problem may occur in a situation other than activation of the system. Specifically, in a case where the system is reactivated when the valve disc 242 of the valve for which execution of the PID control is stopped accelerates in the closing direction, there is a case where the first condition is satisfied, the energization to the valve is cut off, a braking force of the drive motor 243 of the valve is lost due to non-energization, and the valve disc 242 is closed at a speed higher than the durability of the component.

Therefore, in the present embodiment, the air valve controller 62 of the control device 600 does not execute the PID control (energization is cut off) in a case where a condition (second condition) in which an actual valve opening degree (valve opening degree measurement value θm) is less than a measurement value threshold θt2 is also satisfied, in addition to the first condition described above. Stated another way, even in a case where the valve opening degree command value θd is less than the command value threshold θt1 as at the time of reactivation of the system, the air valve controller 62 executes the PID control in a case where the actual valve opening degree is larger than the measurement value threshold θt2. As a result, the valve disc 242 can be prevented from colliding with the valve body 241 side at high speed at the time of reactivation of the system and the component can be protected.

That is, in the present embodiment, the air valve controller 62 of the control device 600 does not execute the PID control of the valve opening degree solely in a case where both the first condition and the second condition are satisfied, and executes the PID control in a case where at least one of the first condition or the second condition is not satisfied. As a result, the fuel cell system 10 according to the present embodiment can suppress the occurrence of the overshoot at the time of activation of the system, can prevent the collision of the valve disc 242 at the time of reactivation of the system, and thus can stably execute the control of the valve opening degree.

Figure 4:
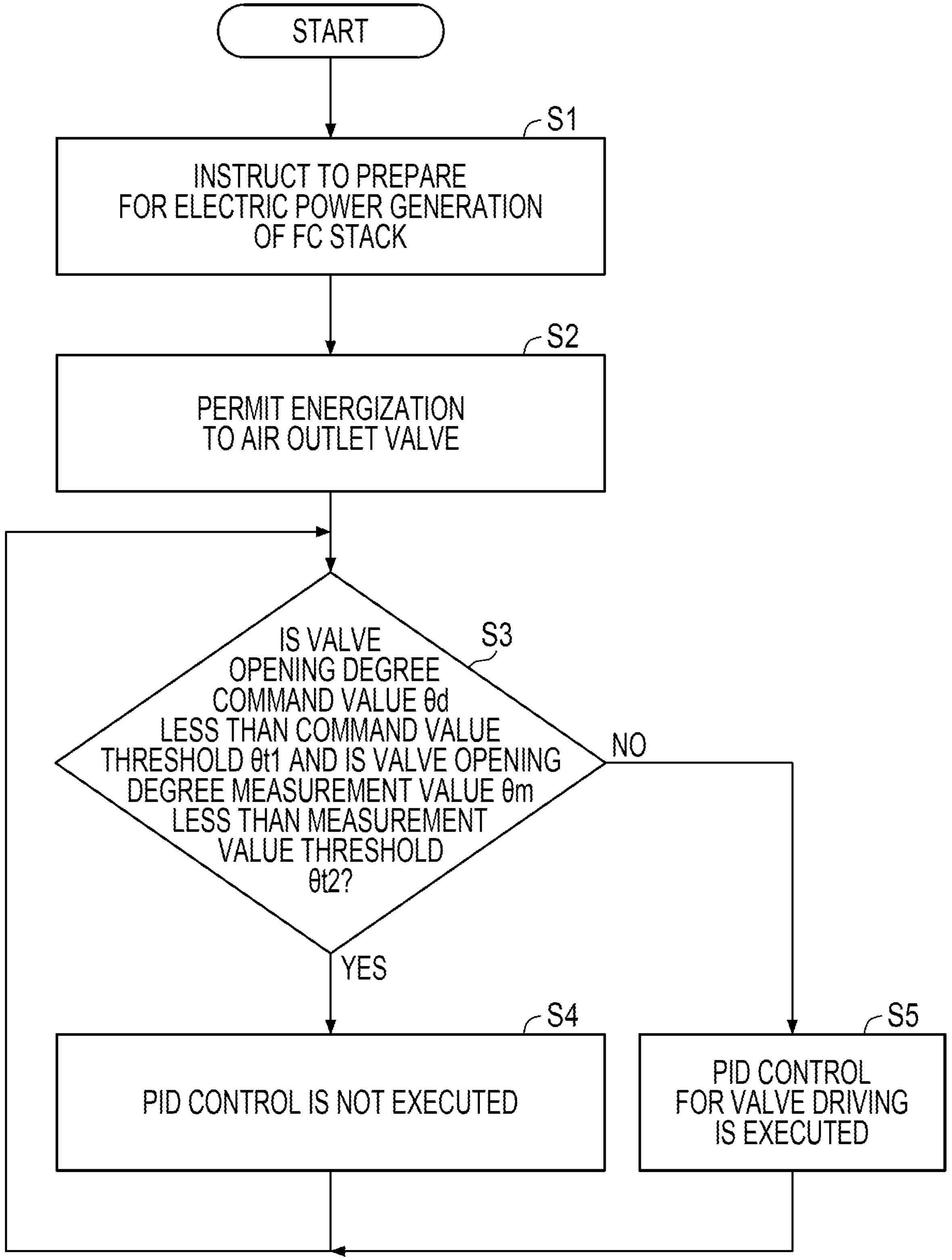
FIG. 4 is a flowchart of valve control at the time of activation of the fuel cell system.
Figure 5:
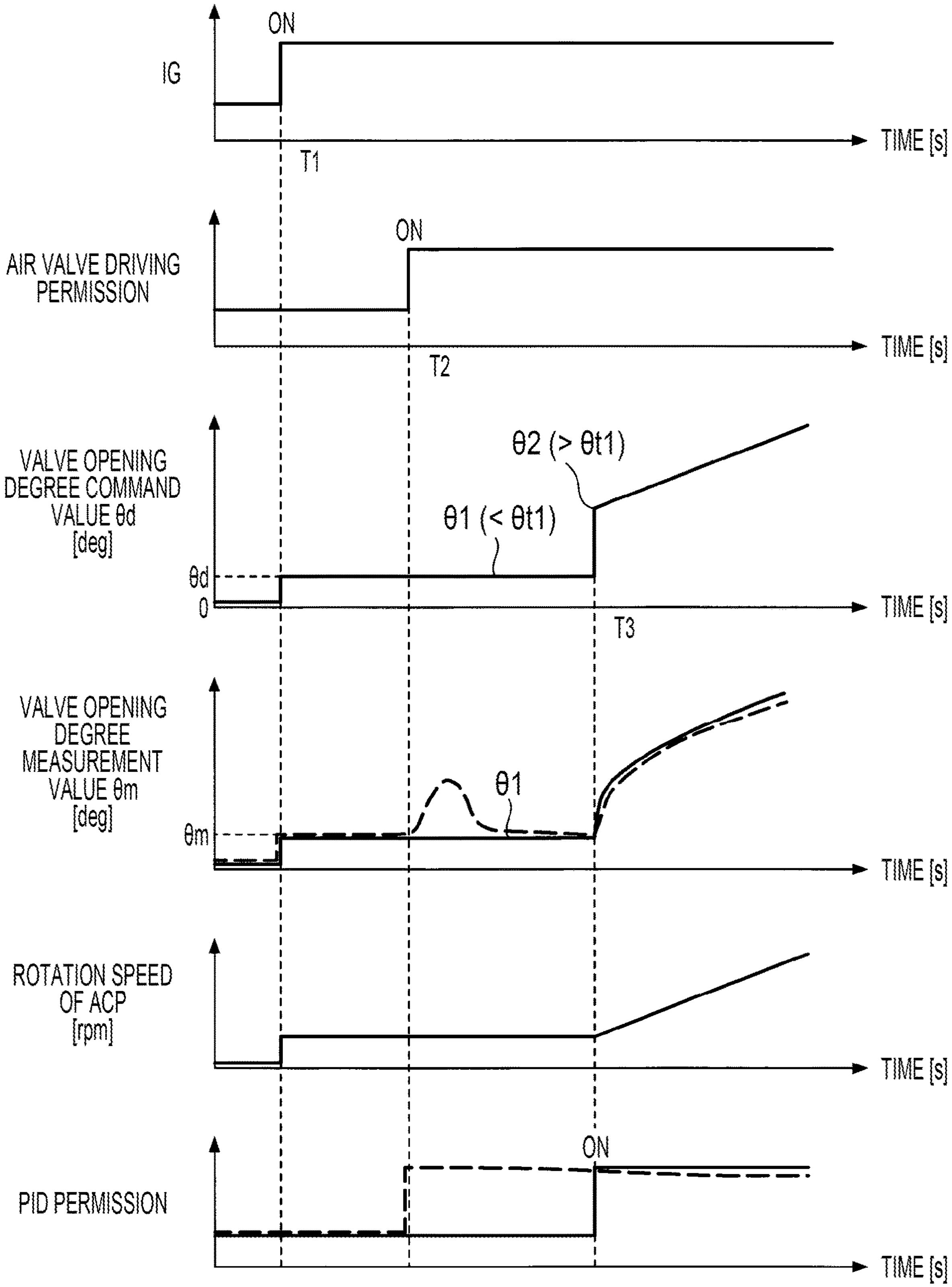
FIG. 5 is a timing chart at the time of activation of the fuel cell system.
Figure 6:
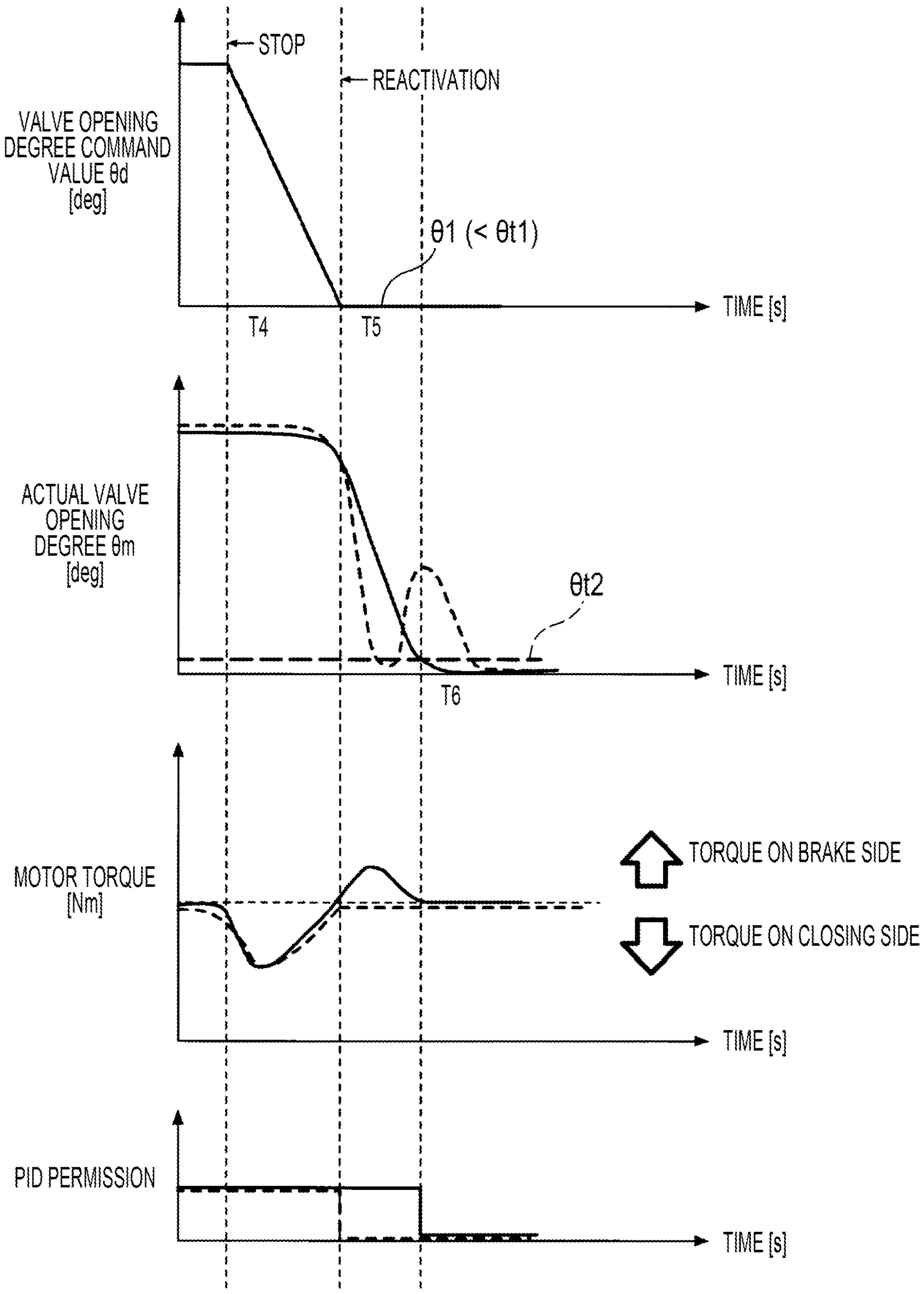
FIG. 6 is a timing chart at the time of reactivation of the fuel cell system.

With reference to FIGS. 4 to 6, the effects of the present embodiment will be further described. FIG. 4 is a flowchart of valve control at the time of activation of the fuel cell system 10. Each process in the flowchart of FIG. 4 is executed by the control device 600.

In step S1, an instruction to prepare for electric power generation of the FC stack (fuel cell 100) is issued, and in step S2, energization to the air outlet valve (discharge flow rate adjusting valve 240) is permitted.

In step S3, the air valve controller 62 determines whether or not the following two conditions for deciding execution and non-execution of the PID control of the valve opening degree of the discharge flow rate adjusting valve 240 are satisfied.

First condition: the valve opening degree command value θd is less than the command value threshold θt1.

Second condition: the valve opening degree measurement value θm is less than the measurement value threshold θt2.

Here, the valve opening degree command value θd is calculated by the valve opening degree deciding unit 61 in accordance with, for example, the electric power generation amount of the fuel cell 100. The valve opening degree measurement value θm is measured by the air valve opening degree sensor 63. The command value threshold θt1 and the measurement value threshold θt2 can be set individually. The command value threshold θt1 is, for example, 3 (deg), and the measurement value threshold θt2 is, for example, 2.5 (deg).

As a result of the determination in step S3, in a case where both the first condition and the second condition are satisfied (Yes in step S3), the process proceeds to step S4, and the PID control is not executed during the period in which these conditions are satisfied.

On the other hand, in a case where at least one of the first condition or the second condition is not satisfied (No in step S3), the process proceeds to step S5, the PID control calculation for valve driving is started, and the PID control is executed.

After the processes of steps S4 and S5 are executed, the process returns to the determination block of step S3, and the decision of execution and non-execution of the PID control is repeated.

FIG. 5 is a timing chart at the time of activation of the fuel cell system 10. FIG. 5 shows the time courses of an ignition (IG), a drive permission signal of the air valve (discharge flow rate adjusting valve 240), the valve opening degree command value θd, the valve opening degree measurement value θm, a rotation speed of the air compressor (ACP), and a PID permission signal. Further, in the column of the valve opening degree measurement value θm, the behavior of the valve when the present embodiment is applied is indicated by a solid line, and in the valve opening degree measurement value, the behavior of the valve in the related art (case where the PID control is started immediately after driving is permitted) is indicated by a dotted line. Similarly, the PID permission signal in the case of the present embodiment is also indicated by a solid line and a PID permission signal in the case of the related art is indicated by a dotted line.

In a case where the ignition is switched to ON at time T1, the processes of steps S1 and S2 in the flowchart of FIG. 4 are executed, and the drive permission signal rises at time T2.

In this case, the valve opening degree command value θd is a low opening degree θ1 (for example, 0.5 degree) close to the fully closed state. In the related art, the PID permission signal rises at the same time as the drive permission signal rises and the feedback control of the valve opening degree is started. However, as described above, due to an individual difference of the tension force between the valve disc 242 and the rubber lip 245 in the valve closed state, there is a case where the feedback control at a low opening degree cannot be executed well, for example, as indicated by a dotted line in the item of the valve opening degree measurement value θm in FIG. 5, feedback is executed in a valve opening direction, and unneeded overshoot occurs.

On the other hand, in the present embodiment, in a case where the processes of steps S3 and S4 in the flowchart of FIG. 4 are executed and the valve opening degree command value θd is less than the predetermined command value threshold θt1 as in the first condition described above, the PID control is not executed. Therefore, the occurrence of the overshoot of the air valve 240 immediately after activation can be suppressed.

Then, at time T3, in a case where an electric power generation command is issued and air supply to the stack of the fuel cell 100 is started, the valve opening degree command value θd increases to the command value threshold θt1 or more. In this case, since the first condition is not satisfied, the processes of steps S3 and S5 in the flowchart of FIG. 4 are executed, the PID permission signal rises, the PID control is started, and then the valve opening degree measurement value θm increases to follow the valve opening degree command value θd by the PID control.

As described above, according to the present embodiment, the occurrence of the overshoot of the air valve 240 at the time of activation of the fuel cell system 10 can be suppressed.

FIG. 6 is a timing chart at the time of reactivation of the fuel cell system 10. FIG. 6 shows the time courses of the valve command opening degree (valve opening degree command value θd), the actual valve opening degree (valve opening degree measurement value θm), the motor torque, and the PID permission signal. The motor torque is the torque output by the motor 243 (see FIG. 3) that drives the air valve 240. In FIG. 6, as in FIG. 5, in the columns of the valve opening degree measurement value θm, the PID permission signal, and the motor torque, the behavior of the valve when the present embodiment is applied is indicated by a solid line, and the behavior of the valve in the related art (case where the PID control is stopped immediately after the system is reactivated) is indicated by a dotted line.

Also at the time of reactivation shown in FIG. 6, the occurrence of a defect can be prevented by executing, by the control device 600, the same processing of execution and non-execution of the PID control as in steps S3 to S5 in the flowchart of FIG. 4.

In a case where the fuel cell is stopped at time T4, the valve opening degree command value θd decreases linearly and monotonically to fully close the air valve 240. The valve opening degree measurement value θm changes to decrease to follow the valve opening degree command value θd while there is a time delay with respect to the change in the valve opening degree command value θd.

In a case where reactivation is started at time T5, in the related art, the PID permission signal is unconditionally switched off at the time of reactivation, and the PID control is not executed. Therefore, in a case where the air valve 240 is moving in the closing direction and the actual valve opening degree θm has a still considerably gap from the fully closed state, when the PID control is stopped, as indicated by a dotted line in the motor torque column in FIG. 6, the motor torque becomes 0 and the torque on the brake side is not generated, and thus the air valve 240 transitions to the fully closed state at once due to the biasing force f2 of the spring 244 (FIG. 3) of the air valve 240 that is a normally closed valve. As a result, as indicated by a dotted line in the item of the valve opening degree measurement value θm in FIG. 6, the behavior occurs in which the valve disc 242 hits the valve body 241 side at a rapid speed, and the valve disc 242 of the air valve 240 is repelled.

On the other hand, in the present embodiment, this problem can be avoided by the control device 600 executing a determination in step S3 in the flowchart of FIG. 4. That is, since the second condition in which the valve opening degree measurement value θm is less than the measurement value threshold θt2 is not satisfied, the processes of steps S3 and S5 in the flowchart of FIG. 4 are executed, the PID permission signal is maintained in the ON state, and the PID control is continuously executed. As a result, after reactivation, the torque on the brake side is generated as indicated by a solid line in the motor torque column in FIG. 6, so that the air valve 240 can change to the valve opening degree command value θ1 while decelerating as shown in the actual valve opening degree θm column in FIG. 6. As a result, the valve disc 242 of the air valve 240 can be prevented from colliding with the valve body 241 side, and the consumption of the components of the air valve 240 can be suppressed.

After the valve opening degree measurement value θm is less than the measurement value threshold θt2 at time T6, the second condition in which the valve opening degree measurement value θm is less than the measurement value threshold θt2 is satisfied, so that the processes of steps S3 and S4 in the flowchart of FIG. 4 are executed, the PID permission signal is switched off, and the PID control is not executed.

As described with reference to FIGS. 4 to 6, with the fuel cell system 10 according to the present embodiment, the control device 600 is configured not to execute the PID control of the valve opening degree of the air valve (discharge flow rate adjusting valve 240) in a case where both the first condition and the second condition are satisfied, the overshoot in the opening direction of the valve disc 242 at the time of activation of the system can be suppressed, the valve disc 242 can be prevented from colliding with the valve body 241 at high speed at the time of reactivation of the system, and thus the control of the valve opening degree of the discharge flow rate adjusting valve 240 can be stably executed.

The present embodiment has been described with reference to specific examples. However, the present disclosure is not limited to the specific examples. The modifications with design change to the specific examples as appropriate made by those skilled in the art are also within the scope of the present disclosure as long as the modifications have the features of the present disclosure. Elements included in each of the specific examples, dispositions thereof, conditions thereof, shapes thereof, and the like are not limited to the described examples, and can be changed as appropriate. The combinations of the elements included in each of the specific examples can be appropriately changed as long as there is no technical contradiction.

In the embodiment, as an example of the valve that decides execution and non-execution of the PID control (feedback control), the discharge flow rate adjusting valve 240 has been described, the valve as the control target is not limited to the discharge flow rate adjusting valve 240, other valves can be applied as long as the valve is disposed in the flow path (air supply system 200 and hydrogen gas supply system 300) through which the reaction gas supplied to the fuel cell 100 flows.

In the embodiment, the configuration in which the discharge flow rate adjusting valve 240 as the control target of the PID control is the butterfly valve as shown in FIG. 3 has been described as an example, but other types of valves may be used as long as the valve opening degree can be adjusted.

What is claimed is:

1. A fuel cell system comprising:

a valve disposed in a flow path through which reaction gas supplied to a fuel cell flows;

a valve opening degree measuring unit configured to measure a valve opening degree measurement value of the valve; and a control device configured to calculate a valve opening degree command value of the valve based on a flow rate of the reaction gas calculated from a target electric power generation amount of the fuel cell and execute feedback control of operation of the valve based on the valve opening degree command value and the valve opening degree measurement value, wherein the control device is configured not to execute the feedback control of the valve in a case where a first condition in which the valve opening degree command value is less than a command value threshold and a second condition in which the valve opening degree measurement value is less than a measurement value threshold are satisfied, and to execute the feedback control of the valve in a case where the first condition or the second condition is not satisfied, and wherein the valve includes a valve body, a valve disc configured to open and close an internal flow path of the valve body by rotating with a valve stem as an axis, and a seal member disposed between the valve disc and the internal flow path of the valve body.

2. The fuel cell system according to claim 1, wherein:

the flow path is a release flow path connected to an outlet of a cathode of the fuel cell; and the valve is a discharge flow rate adjusting valve disposed in the release flow path.

3. A control method of a fuel cell system including a valve disposed in a flow path through which reaction gas supplied to a fuel cell flows, the method comprising:

measuring, by a valve opening degree measuring unit, a valve opening degree measurement value of the valve;

calculating, by a control device, a valve opening degree command value of the valve based on a flow rate of the reaction gas calculated from a target electric power generation amount of the fuel cell; and executing, by the control device, feedback control of operation of the valve based on the valve opening degree command value and the valve opening degree measurement value, wherein, by the control device, the feedback control of the valve is not executed in a case where a first condition in which the valve opening degree command value is less than a command value threshold and a second condition in which the valve opening degree measurement value is less than a measurement value threshold are satisfied, and the feedback control of the valve is executed in a case where the first condition or the second condition is not satisfied, and wherein the valve includes a valve body, a valve disc configured to open and close an internal flow path of the valve body by rotating with a valve stem as an axis, and a seal member disposed between the valve disc and the internal flow path of the valve body.

* * * * *